(12) United States Patent
Berlin

(10) Patent No.: US 10,979,561 B1
(45) Date of Patent: Apr. 13, 2021

(54) PIN OR SECRET-CODE BASED CALLER-ID VALIDATION SYSTEM

(71) Applicant: Stephanie Carole Berlin, Amissville, VA (US)

(72) Inventor: Stephanie Carole Berlin, Amissville, VA (US)

(73) Assignee: Stephanie Carole Berlin, Amissville, VA (US)

( * ) Notice: Subject to any disclaimer, the term of this patent is extended or adjusted under 35 U.S.C. 154(b) by 0 days.

(21) Appl. No.: 16/699,528

(22) Filed: Nov. 29, 2019

(51) Int. Cl.
*H04M 3/42* (2006.01)
*H04M 1/665* (2006.01)
*H04M 3/436* (2006.01)

(52) U.S. Cl.
CPC ....... *H04M 3/42068* (2013.01); *H04M 1/665* (2013.01); *H04M 3/4365* (2013.01)

(58) Field of Classification Search
CPC combination set(s) only.
See application file for complete search history.

(56) References Cited

U.S. PATENT DOCUMENTS

| 9,332,119 B1* | 5/2016 | Danis ................. H04M 3/42042 |
| 2013/0016822 A1* | 1/2013 | Vendrow ........... H04M 3/42229 379/211.01 |
| 2019/0268324 A1* | 8/2019 | Sailappan ............. H04L 63/205 |
| 2020/0162253 A1* | 5/2020 | Daly .................... H04L 63/0807 |

* cited by examiner

Primary Examiner — Phung-Hoang J Nguyen

(57) ABSTRACT

A telephony call connection process is provided which assumes that 100% of received calls have spoofed sources or contain otherwise untrustworthy caller-id (CID) information, and requires each caller to provide a prearranged personal identification number "PIN" (or secret code) associated with their caller-id (CID) in order to complete a connection. Additional mechanisms are provided to create and exchange the PIN (or secret code) in an environment in which the caller must first establish the ownership of the caller-id (CID) provided. The process described herein minimizes the risk of false positives and virtually eliminates the need for manual "screening" as is often required of the callee in similar systems. Furthermore, the process described herein is capable of operating entirely on the callee's equipment providing the same level of effectiveness entirely devoid of participation from any other switch or node in the call path or on the network.

17 Claims, 1 Drawing Sheet

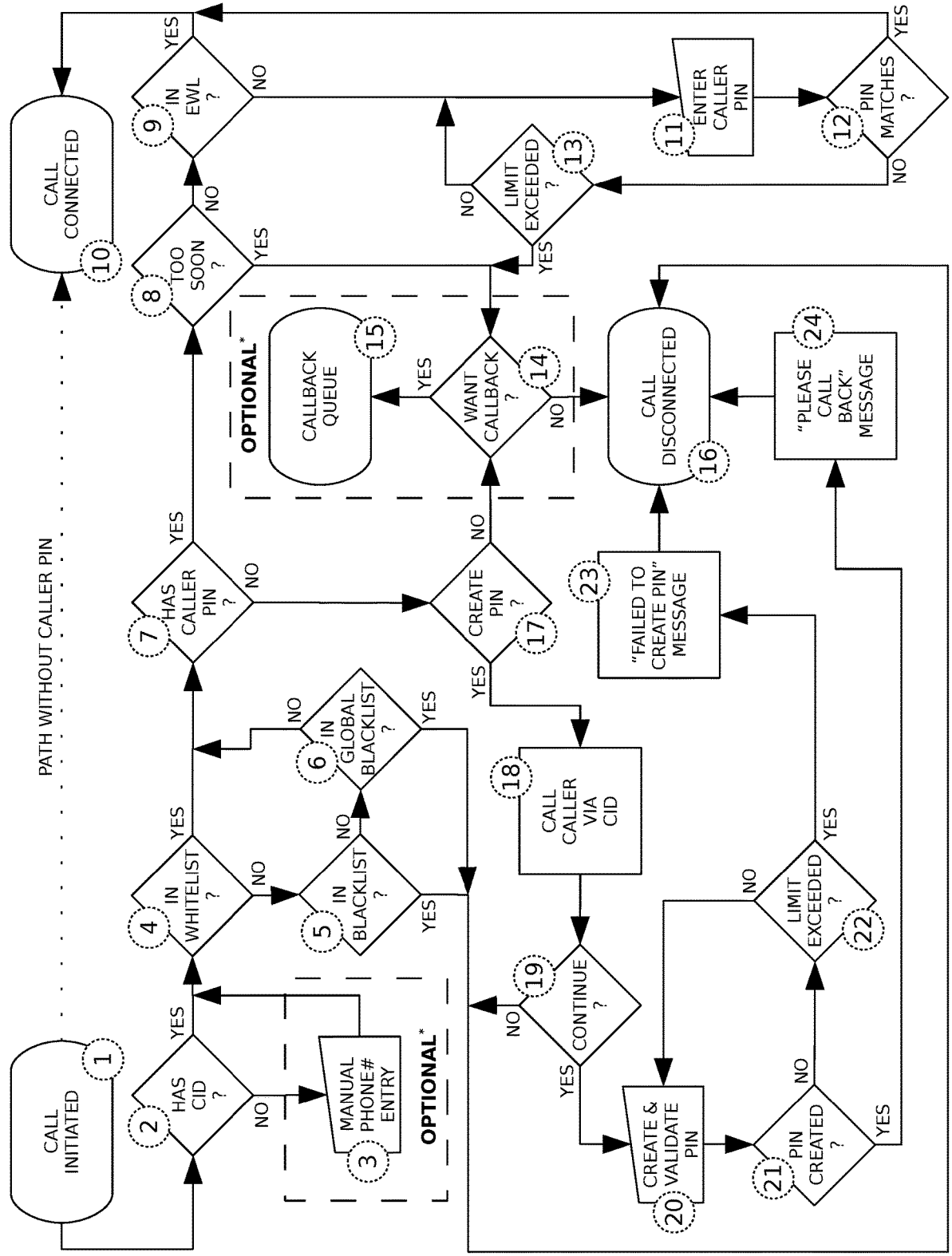

PIN OR SECRET-CODE BASED CALLER-ID VALIDATION SYSTEM

BACKGROUND OF THE INVENTION

1. Field of the Invention

The present invention relates to the field of telephony, and specifically to the identification, authentication and classification of callers within a telephony, network or internet telephony, or software telephony based dialog.

2. Description of Related Art

Many mechanisms exist which attempt to verify the calling party's network(s); and which heuristically identify and filter network nodes statistically involved in high volume caller-id spoofing. Other mechanisms exist which, unlike the present invention, require direct participation of the calling party's network (e.g. Signature-based Handling of Asserted Information Using toKENs <SHAKEN>) in order to function. These mechanisms depend on establishing new communication-network-level protocols or in-depth data analysis; and are complex and prone to errors and further manipulation. While the present invention differs greatly from these mechanisms in terms of complexity; no requirement of the present invention is expected to preclude both the present invention and any other related art mechanism from working independently from each other, or from one acting as an extension of the other.

Mechanisms also exist to validate computer network-client sessions based on shared-secrets, passwords or personal identification numbers "PIN's" (or secret codes) at individual user levels.

The present invention leverages PIN's (or secret codes) to establish continuity between multiple sessions. This is done by, first, creating an association between an individual caller and their PIN (or secret code). Once this association has been established, all future sessions may be validated by challenging callers to confirm their PIN (or secret code). The present invention provides novel means in which to establish and validate the individual on record for any given caller-id.

The following patents show a representative sampling of related caller-id and PIN (or secret code) validation techniques.

U.S. Pat. No. 8,254,541, issued Aug. 28, 2012 to Yigang Cai, describes use of centralized system for validating authorized nodes.

U.S. Pat. No. 9,060,057, issued Jun. 16, 2015 to Serdar Artun Danis, describes a system where a caller authentication device transmits both source and destination phone numbers to a called authentication device in order to validate the session.

U.S. Pat. No. 8,135,119, issued Mar. 13, 2012 to Xiaoming Zhao, Gang Chen, and Kan Dong, describes a caller authentication system where the called party utilizes an interactive voice response (IVR) to classify and direct the caller to various menu options.

U.S. Pat. No. 8,774,379, issued Jul. 8, 2014 to Simon Youngs, Gary Duane Koller, Mark Douglas Peden, and Raymond Emilio Reeves, describes a method leveraging call-setup details and point codes to determine authenticity of caller via calling network devices.

U.S. Pat. No. 6,996,217, issued Feb. 7, 2006 to Phillip Y. Goldman, describes a method of utilizing toll-free telephone facilities and intercepting, decoding, and converting automatic number identification (ANI) into caller-id information.

U.S. Pat. No. 7,974,395, issued Jul. 5, 2011 to Sandra R. Abramson, and Stephen M. Milton, describes a method of leveraging other call characteristics such as telephone type and signaling protocol in addition to caller-id to determine authenticity.

U.S. Pat. No. 8,040,875, issued Oct. 18, 2011 to Deborah Lewandowski Barclay, David S Benco, Sanjeev Mahajan, Thomas Lee McRoberts, and Raymond Leroy Ruggerio, describes a method of attempting to validate IP and routing information while processing SIP invites and voice-over-internet-protocol (VoIP) calls.

U.S. Pat. No. 8,234,498, issued Jul. 31, 2012 to Michael A. Britti, Michael Jon Mauseth, Joel R. Springer, and Robert D. Thornley, describes a method of using PIN's to classify and provide capabilities for screening data in a multi-kiosk and multi-client environment.

U.S. Pat. No. 6,715,078, issued Mar. 30, 2004 to Stephen John Chasko, David Junghans, and Adrian Shields, describes a method of encrypting PIN's leveraging cryptographic smart cards for use in ATM's.

U.S. Pat. No. 8,472,594, issued Jun. 25, 2013 to Darren New, Miles Paschini, and Marshall Rose, describes a method of distributing prepaid telephone card PIN's over a network.

None of the above inventions and patents, taken either singly or in combination, is seen to describe the instant invention as claimed, nor can an obvious derivation or connection be established between the distinct concepts provided herein as prior art and the embodiments of the present invention.

SUMMARY OF THE INVENTION

The present invention provides a mechanism to authenticate the caller in a telephony, digital network based telephony, or software based telephony call connection.

The caller must provide caller-id proof of ownership (or authenticate) by entering a PIN (or secret code) known herein as a caller-pin via software, a traditional DTMF dial-pad, or similar mechanism capable of communicating the caller-pin to the destination device.

Mechanisms to enable multiple local, community and service provider supplied filtering features via blacklists, whitelists or any combination thereof are also provided for. One or more enhanced filtering mechanisms may also exist in order to manage complex conditions; including but not limited to unauthenticated caller-id's via Elevated/Emergency WhiteLists (EWL's).

BRIEF DESCRIPTION OF THE DRAWINGS

FIG. 1 is a diagram depicting the conditions, logical flow, branching and validation for a caller-pin call setup according to an exemplary embodiment of the present invention.

DETAILED DESCRIPTION OF THE PREFERRED EMBODIMENTS

The described example is provided for illustrative purposes and is not intended to limit the scope of the present invention.

The present invention provides a mechanism whereby the caller-id of the calling party (caller) for a telephone call can be validated by the called party (callee), or an agent thereof, by use of a PIN (or secret code) known herein as caller-pin.

The present invention makes no demands on the infrastructure, including network nodes and signaling; but rather assumes the caller-id has been falsified for 100 percent of received calls and requires the user to provide proof of ownership by providing a second piece of information known only to the actual owner of the caller-id on record. Once the caller has been validated, a variety of filters and rules (blacklists, whitelists, call-flow-management, etc.) may be applied.

FIG. 1 provides a reference diagram to the logical implementation of the present invention, labeled 1-24.

The dotted connection between labels 1 and 10 represents the normal call flow of a telephone call without the present invention where label 1 is the caller's initiation device and label 10 the callee's termination device; which may be a telephone, facsimile (fax), modem, voicemail, answering service or device, or other similar device.

There are two sections identified as optional, including labels 3, 14 and 15. Should the implementer decide to omit either or both of these sections, the omitted features will be immediately directed to the "call disconnected" node at label 16.

The first logical test (label 2), determines whether or not a caller-id (CID) was received. Only the received telephone number (CID) will be used to determine if this test results in YES or NO (i.e. caller-name must not be used). Should the optional section (label 3) be implemented, and an empty, null or otherwise non-actionable CID be received (e.g. all zeroes, "anonymous", "caller unknown", etc.,) (NO) the user will be prompted to enter their phone number manually; disconnecting upon failure or timeout.

At this point (label 4), the CID can be checked against a local whitelist maintained by the callee or at their behest. A local whitelist match (YES) will continue to label 7, otherwise (NO) to label 5. Label 5 will check the CID against a local blacklist maintained by the callee or at their behest. A local blacklist match (YES) will result in an immediate call disconnect (label 16), otherwise (NO) it will continue to label 6. Label 6 will check the CID against a global blacklist maintained by the callee's service provider, or an agent thereof. A global blacklist match (YES) will result in an immediate call disconnect (label 16), otherwise (NO) it will continue to label 7. Should the implementer not include or the provider choose to not maintain a global blacklist, the call flow should immediately continue to label 7.

Label 7 provides a mechanism to determine whether or not the CID has an assigned PIN (or secret code). This mechanism should be provided by the receiver's call provider, although it is conceivable, and within the scope of the present invention, an arrangement could exist between several call providers offering a federated mechanism to resolve CID-PIN association. If it is determined that no PIN (or secret code) has been assigned to the CID, the caller will be directed to label 17 where asked whether or not they would like to continue by creating a PIN (or secret code).

Should the caller decide not to create a PIN (or secret code) (NO), the caller will be directed to the optional callback queue if implemented (label 14); or if not implemented, immediately disconnected (label 16) with an optional message. If a callback is selected (YES), the callback-queue will provide a simple indicator (label 15) to the called party that a call was attempted by the caller-id currently known to the system, otherwise (NO) the call will be immediately disconnected (label 16). Only one indicator per CID may exist within the called party's callback-queue at any time. Since the callback-queue follows both blacklists in the logical flow, access to it can be controlled.

Should the caller decide to create the PIN (or secret code) (YES), the original call will be disconnected and the original caller will be called back (label 18) via the CID currently known by the system and optionally (recommended) using the original callee's phone number as the caller-id for this call in an attempt to help provide continuity and the perception of a seamless step in the initial call attempt. This single action will definitively determine whether the phone number provided by the CID is indeed the original caller.

Should the original phone number provided by caller-id be a spoofed one, the message provided must make it obvious as to what is being attempted (label 19). A simple message stating, "if you did not attempt a call to <original callee's phone-number>, please hang up . . . If you would like to continue by creating a caller-pin, please press 1 to continue." or similar should suffice. Continuing (YES) at this point will prompt (label 20) the original caller to create and validate a PIN (or secret code) which will be associated with their phone number, hanging up (NO) obviously results in the call being disconnected. The recommended length for a PIN (or secret code) is 7 digits. This length along with the recommended delays offers an adequate defense against brute force attacks, should be easy to remember, and should discourage the use of dates (8 digits) as a PIN (or secret code).

Label 21 checks to see if the PIN (or secret code) was successfully created and validated. If the PIN (or secret code) creation and validation was successful (YES), a message prompting the original caller to attempt the call again will be played (label 24) and the call will then be disconnected (label 16). The unsuccessful creation of a PIN (or secret code) (NO) results in a retry (label 20) unless the maximum attempt limit has been exceeded (label 22) (YES) where a failed to create PIN (or secret code) message is played (label 23) and the call disconnected (label 16).

Revisiting label 7, if the CID does have an associated PIN (or secret code) (YES), a quick check (label 8) to determine whether a recent PIN validation failure has occurred (label 13) and if so, whether or not enough time has passed before allowing another attempt. The recommended delay between pin entry attempt cycles is 10 minutes. This delay should discourage brute force attempts to determine a caller's caller-pin and provide a short enough window to minimize impact on legitimate callers.

If not enough time has elapsed (YES), the caller will be directed to the optional callback queue if implemented (label 14) or if not implemented, immediately disconnected (label 16) with an optional message. If selected (YES), the callback-queue will provide a simple indicator (label 15) to the called party that a call was attempted by the caller-id currently known to the system, otherwise (NO) the call will be immediately disconnected (label 16). Only one indicator per CID may exist within the called party's callback-queue at any time. Since the callback-queue follows both blacklists in the logical flow, access to it can be controlled.

If the CID is not currently in a wait period (NO), it will optionally be checked against an emergency whitelist (EWL) maintained by the callee or at their behest (label 9). An EWL match (YES) will result in an immediate call connection (label 10). CID's without matches in the EWL (NO) will continue to a prompt (label 11) for the PIN (or secret code). The EWL should be used sparingly as eventually technology will likely provide direct associations between a callee and their trusted phone numbers whereby this may become a source of great frustration.

The caller provided PIN (or secret code) will then be compared with the one on record (label 12) and if it matches (YES) the call will be immediately connected (label 10). Non-matching caller provided PIN's (or secret codes) (NO) will result in a retry until the the maximum attempt limit has been exceeded (label 13) where it will either provide access to the callback-queue (label 14) or immediately disconnect the call (label 16). The recommended maximum caller-pin entry attempt is 3.

At the core of FIG. 1, and indeed the present invention are labels 1, 2, 7, 12 and 10. Many optimizations and efficiencies may be found through managing and linking various data sources, lists of pass/fail and a federated suite of application programming interfaces (or API's) but none of these extensions are required to support the present invention. Although descriptions for the present invention include manual entry of PIN (or secret code); automated tools, proxies and smart-device applications all fall within scope and may be used to extend and enhance system security, the overall user experience (UX) and provide seamless system integration.

I claim:

1. A method call session comprising a management system servicing the called party (callee), capable of validating pre-authorizing the routing and termination from the calling party (caller) of a telephone call, network-based telephone call, software-based telephone call, or call session comprising:
   (1) a network provided caller-id or telephone number of the calling party (caller);
   (2) a mechanism whereby the original called party (callee), or an agent thereof, can establish a connection back to the original calling party (caller) as means of ascertaining that the network provided caller-id or telephone number is in fact under the current control of the original calling party (caller);
   (3) a callback-queue indicator service capable of storing only unique caller-id's for calls failing to connect under certain conditions and only where inclusion into said queue is determined by calling party (caller); and offering the called party (callee) the ability to view and manage caller-id's stored therein;
   (4) a personal identification number (PIN) or secret code, belonging to calling party (caller), or an authorized agent thereof;
   (5) another mechanism whereby the calling party (caller), or an agent thereof, can communicate their PIN or secret code to the called party (callee), or an agent thereof;
   (6) a sub-system capable of validating a caller-provided (PIN) or secret code associated with the caller-id for the called party (callee), or an agent thereof;
   whereby said system establishes its characteristically simple bidirectional, and verifiable means of validating and authorizing said call session.

2. The method of claim 1, further comprising of zero or more access control filters, each consisting of internally or externally managed rulesets to which the called party (callee), or an agent thereof can subscribe to.

3. The method of claim 1, further comprising of zero or more limit control functions, each consisting of timers, loop counters, or general purpose logic counters used in order to minimize the risk of service interrupt.

4. The method of claim 2, further comprising of zero or more limit control functions, each consisting of timers, loop counters, or general purpose logic counters used in order to minimize the risk of service interrupt.

5. The method of claim 1, further comprising of external or remote services used to centralize, or securely share or distribute functions used in creation, management or validation of caller-id to (PIN) or secret code mapping, rulesets or combinations thereof.

6. The method of claim 4, further comprising of external or remote services used to centralize, or securely share or distribute functions used in creation, management or validation of caller-id to (PIN) or secret code mapping, rulesets or combinations thereof.

7. The method of claim 1, further comprising of zero or more devices, agents, proxies, services or applications capable of providing the (PIN) or secret code offered by the calling party (caller) while initiating a call session to the called party (callee), either verbatim or by mechanisms which will not directly expose the unencoded or "cleartext" version of the caller's (PIN) or secret code.

8. The method of claim 4, further comprising of zero or more devices, agents, proxies, services or applications capable of providing the (PIN) or secret code offered by the calling party (caller) while initiating a call session to the called party (callee), either verbatim or by mechanisms which will not directly expose the unencoded or "cleartext" version of the caller's (PIN) or secret code.

9. The method of claim 6, further comprising of zero or more devices, agents, proxies, services or applications capable of providing the (PIN) or secret code offered by the calling party (caller) while initiating a call session to the called party (callee), either verbatim or by mechanisms which will not directly expose the unencoded or "cleartext" version of the caller's (PIN) or secret code.

10. The method of claim 1, further comprising of a sub-system or service for the calling party (caller), not functioning as subscriber (callee), to remotely and securely manage the (PIN) or secret code associated with their caller-id.

11. The method of claim 4, further comprising of a sub-system or service for the calling party (caller), not functioning as subscriber (callee), to remotely and securely manage the (PIN) or secret code associated with their caller-id.

12. The method of claim 6, further comprising of a sub-system or service for the calling party (caller), not functioning as subscriber (callee) to remotely and securely manage the (PIN) or secret code associated with their caller-id.

13. The method of claim 7, further comprising of a sub-system or service for the calling party (caller), not functioning as subscriber (callee) to remotely and securely manage the (PIN) or secret code associated with their caller-id.

14. The method of claim 8, further comprising of a sub-system or service for the calling party (caller), not functioning as subscriber (callee) to remotely and securely create and manage the (PIN) or secret code associated with their caller-id.

15. The method of claim 9, further comprising of a sub-system or service for the calling party (caller), not functioning as subscribers (callees), to remotely and securely manage the (PIN) or secret code associated with their caller-id.

16. The method of claim 1, further comprising of a mechanism for the calling party (caller), not functioning as subscriber (callee), to manually correct or provide an alternate caller-id or telephone number for the calling party (caller).

17. The method of claim 9, further comprising of a mechanism for the calling party (caller), not functioning as subscriber (callee) to manually correct or provide an alternate caller-id or telephone number for the calling party (caller).

\* \* \* \* \*